(12) United States Patent
Biswas et al.

(10) Patent No.: US 8,856,459 B1
(45) Date of Patent: Oct. 7, 2014

(54) MATRIX FOR NUMERICAL COMPARISON

(75) Inventors: Sukalpa Biswas, Fremont, CA (US); Hao Chen, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 13/313,327

(22) Filed: Dec. 7, 2011

(51) Int. Cl.
*G06F 13/18* (2006.01)

(52) U.S. Cl.
USPC .......................................... 711/151; 710/244

(58) Field of Classification Search
None
See application file for complete search history.

(56) References Cited

U.S. PATENT DOCUMENTS

| | | | |
|---|---|---|---|
| 3,921,134 A | 11/1975 | Myagkov et al. | |
| 5,168,570 A * | 12/1992 | Eckert et al. | 710/241 |
| 5,315,599 A | 5/1994 | Chaboud et al. | |
| 6,384,627 B1 | 5/2002 | Fross et al. | |
| 6,782,457 B2 * | 8/2004 | Hill et al. | 711/158 |

* cited by examiner

*Primary Examiner* — Gary Portka
(74) *Attorney, Agent, or Firm* — Meyertons, Hodd, Kivlin, Kowert & Goetzel, P.C.

(57) ABSTRACT

A method and apparatus for utilizing a matrix to store numerical comparisons is disclosed. In one embodiment, an apparatus includes an array in which results of comparisons are stored. The comparisons are performed between numbers associated with agents (or functional units) that have access to a shared resource. The numbers may be a value to indicate a priority for their corresponding agents. The comparison results stored in an array may be generated based on comparisons between two different numbers associated with two different agents, and may indicate the priority of each relative to the other. When two different agents concurrently assert requests for access to the shared resource, a control circuit may access the array to determine which of the two has the higher priority. The agent having the higher priority may then be granted access to the shared resource.

21 Claims, 7 Drawing Sheets

MATRIX FOR NUMERICAL COMPARISON

BACKGROUND

1. Field of the Invention

This invention relates to computer systems, and more particularly, to prioritizing requests from multiple agents for access to a resource in a computer system.

2. Description of the Related Art

In digital systems such as computers, portable electronic devices, and so on, multiple agents may issue requests for access to a particular resource. Furthermore, multiple requests for access to the resource may be outstanding at a given time. One example of such a resource is a memory, while examples of agents include processor cores, graphics controllers, I/O interfaces, and so on.

Access to resources such as a memory may be limited in many systems. Accordingly, when multiple requests for access to such a resource are concurrently pending, arbitration algorithms may be implemented to determine which agent receives access at a given time. For example, a memory controller may use an arbitration algorithm to determine which requesting agent is given priority for a next access. In some cases, simple algorithms such as round-robin may be used to choose which requesting agent receives access to the resource. However, in some cases, more complex algorithms for determining priority may be used. In such cases, age of requests, weighting, and other factors may be considered to determine priority. In such cases, the priority for each requesting agent (or for each request) may be given a number that reflects the various prioritization factors. When considering which agent to grant access to the resource, the unit performing the arbitration may compare the number associated with one agent (or request) with a number associated with another agent (or request). Based on the comparison results, the unit performing the arbitration may then grant access to the agent or request having the highest priority.

SUMMARY

A method and apparatus for utilizing a matrix to store numerical comparisons is disclosed. In one embodiment, an apparatus includes an array in which results of comparisons are stored. The comparisons are performed between numbers associated with agents (or functional units) that have access to a shared resource. The numbers may be a value to indicate a priority for their corresponding agents. The comparison results stored in an array may be generated based on comparisons between two different numbers associated with two different agents, and may indicate the priority of each relative to the other. When two different agents concurrently assert requests for access to the shared resource, a control circuit may access the array to determine which of the two has the higher priority. The agent having the higher priority may then be granted access to the shared resource.

In one embodiment, a method includes a comparator comparing a first value to a second value. The first value may be a priority value associated with a first functional unit, while the second value may be a priority value associated with a second functional unit. The comparator may determine a priority for access to a shared resource (e.g., a system memory) for the first functional unit relative to the second functional unit (and vice versa). The result of the comparison may be written into an array. If, subsequent to the comparison being performed, the first and second functional units have concurrently outstanding requests for access to the shared resource, a control circuit may access the corresponding comparison result from the array to determine which of the two functional units has the higher priority. The unit determined to have the higher priority may be granted accessed to the shared resource.

BRIEF DESCRIPTION OF THE DRAWINGS

The following detailed description makes reference to the accompanying drawings, which are now briefly described.

Figure 1:
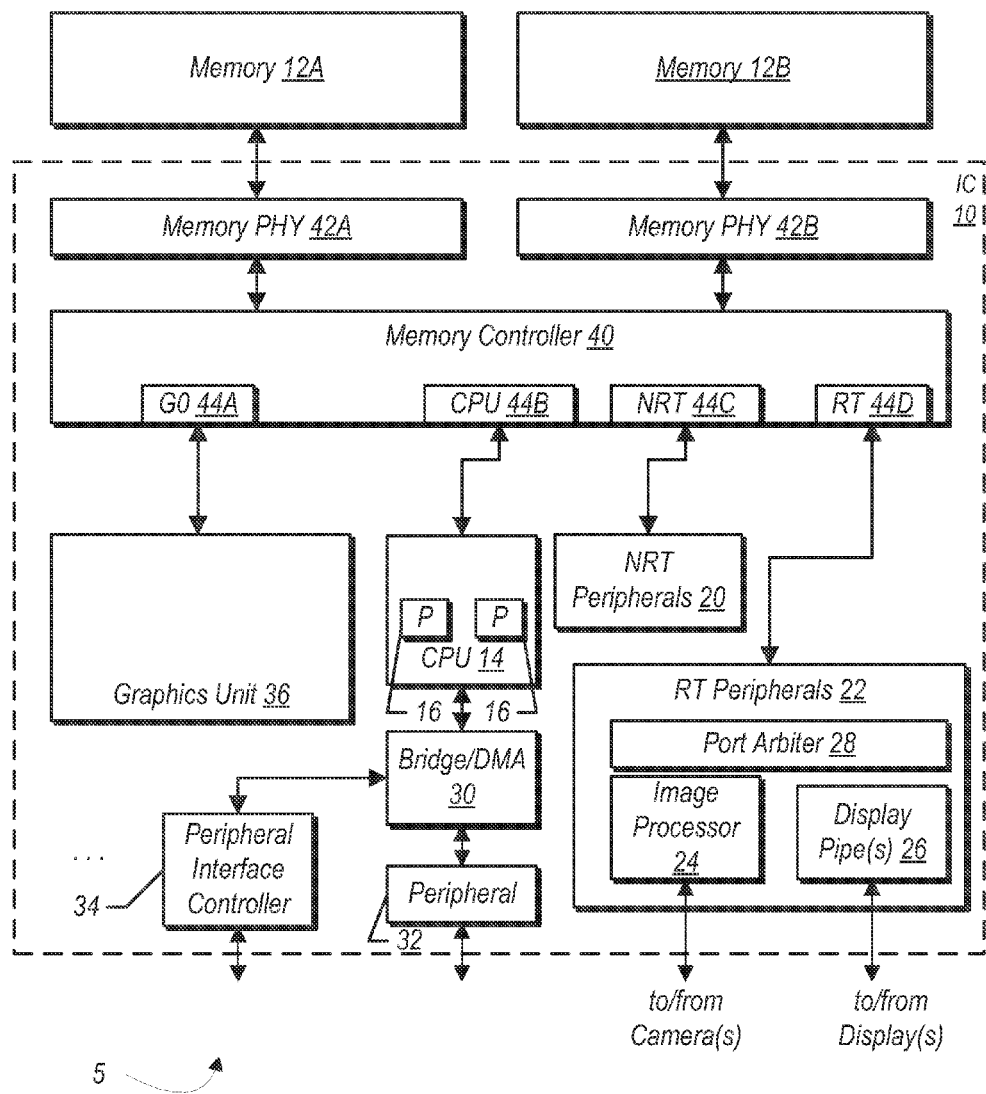
FIG. 1 is a block diagram of one embodiment of a system including a memory controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, IC 10 includes a central processor unit (CPU) block 14 which includes one or more processors 16 (or processor cores). Embodiments that include more than two processors 16 and that include only one processor 16 are contemplated. IC 10 further includes a set of one or more non-real time (NRT) peripherals 20 and a set of one or more real time (RT) peripherals 22. In the illustrated embodiment, the RT peripherals include an image processor 24, one or more display pipes 26, and a port arbiter 28. Other embodiments may include more or fewer image processors 24, more or fewer display pipes 26, and/or any additional real time peripherals as desired. The image processor 24 may be coupled to receive image data from one or more cameras in the system 5. Similarly, the display pipes 26 may be coupled to one or more display controllers (not shown) that control one or more displays in the system. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44D. Port 44A is coupled to graphic unit 36. The CPU block 14 is coupled to the port 44B. The NRT peripherals 20 and the RT peripherals 22 are coupled to the ports 44C-44D, respectively. The number of ports included in a memory controller 40 may be varied in other embodiments, as may the number of memory controllers. The number of memory PHYs 42A-42B and corresponding memories 12A-12B may be one or more than two in other embodiments.

In one embodiment, each port 44A-44D may be associated with a particular type of traffic. For example, in one embodiment, the traffic types may include RT traffic, NRT traffic, and graphics traffic. Other embodiments may include other traffic types in addition to, instead of, or in addition to a subset of the above traffic types. Each type of traffic may be characterized differently (e.g. in terms of requirements and behavior), and the memory controller may handle the traffic types differently to provide higher performance based on the characteristics. For example, RT traffic requires servicing of each memory operation within a specific amount of time. If the latency of the operation exceeds the specific amount of time, erroneous operation may occur in the RT peripheral. For example, image data may be lost in the image processor 24 or the displayed image on the displays to which the display pipes 26 are coupled may visually distort. RT traffic may be characterized as isochronous, for example. On the other hand, graphics traffic may be relatively high bandwidth, but is not latency-sensitive. NRT traffic, such as from the processors 16, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage).

By providing ports 44A-44D associated with different traffic types, the memory controller 40 may be exposed to the different traffic types in parallel, and may thus be capable of making better decisions about which memory operations to service prior to others based on traffic type. In some embodiments, each port may be dedicated exclusively to either RT or NRT traffic. In other embodiments, the ports may be associated with the particular traffic type, but other traffic types may be supported on the port. In an embodiment, graphics traffic may be considered to be NRT traffic, but having visibility to the graphics traffic separate from other NRT traffic may be useful for bandwidth balancing among the other NRT sources and the RT source. Similarly, having the processor traffic separate from the other NRT sources may be useful in bandwidth balancing. In the illustrated embodiment, the RT port 44D may be associated with RT traffic and the remaining ports 44A-44C may be associated with NRT traffic. Generally speaking, traffic type may be a consideration in assigning priority values for corresponding agents requesting access to one of memories 12A and 12B.

Generally, a port may be a communication point on the memory controller 40 to communicate with one or more sources. In some cases, the port may be dedicated to a source (e.g., ports 44A may be dedicated to graphics unit 36). In other cases, the port may be shared among multiple sources (e.g. the processors 16 may share the CPU port 44B, the NRT peripherals 20 may share the NRT port 44C, and the RT peripherals such as the display pipes 26 and the image processor 24 may share the RT port 44D. A port may be coupled to a single interface to communicate with the one or more sources. Thus, when sources share an interface, there may be an arbiter on the sources' side of the interface to select between the sources. For example, the port arbiter 28 may serve as an arbiter for the RT port 44D, and a similar port arbiter (not shown) may be an arbiter for the NRT port 44C. The single source on a port or the combination of sources on a port may be referred to as an agent. Additional arbitration and prioritization may be performed within memory controller 40, as will be discussed below.

Each port 44A-44D is coupled to an interface to communicate with its respective agent. The interface may be any type of communication medium (e.g. a bus, a point-to-point interconnect, etc.) and may implement any protocol. In some embodiments, the ports 44A-44D may all implement the same interface and protocol. In other embodiments, different ports may implement different interfaces and/or protocols. For example, the embodiment illustrated in FIG. 1 includes the graphics unit 36 using one type of interface/protocol and the CPU block 14, the NRT peripherals 20 and the RT peripherals 22 using another type of interface/protocol. An interface may refer to the signal definitions and electrical properties of the interface, and the protocol may be the logical definition of communications on the interface (e.g. including commands, ordering rules, coherence support if any, etc.). Supporting more than one interface on the various ports 44A-44D may eliminate the need to convert from one interface supported by a source/agent and the interface supported by the memory controller 40, which may improve performance in some embodiments. Additional, some embodiments of the integrated circuit 10 may include circuitry purchased from a third party as a prepackaged unit typically referred to in the industry as intellectual property (IP). The IP may be "hard" (in which case it is specified as a netlist of circuits that are laid out and placed on the IC as a block) or "soft" (in which case it is specified as a synthesizable block that can be synthesized with other blocks to be included in the integrated circuit 10). Both soft and hard IP include a specified interface and protocol, which generally cannot be changed by the designer of the integrated circuit 10 (at least without payment of fees to the third party that owns the IP). Accordingly, supporting multiple interfaces/protocols may permit easier inclusion of third party IP.

The memory controller 40 may be configured to determine the memory channel addressed by each memory operation received on the ports, and may be configured to transmit the memory operations to the memory 12A-12B on the corresponding channel. The number of channels and the mapping of addresses to channels may vary in various embodiments and may be programmable in the memory controller. In one embodiment, priority rankings may be applied to each of the agents, and may be used to determine an order of memory operations transmitted into the channel. That is, the memory controller may reorder the memory operations from their original order of receipt on the ports, based on relative priority rankings. In addition, the priority rankings for a given agent may be updated at various times, and thus relative priorities may change. Priority rankings and their use will be discussed in further detail below.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches. Other embodiments may include multiple levels of caches in the processors 16.

Graphics unit 36 may implement any type of graphics processing circuitry. Generally, the graphics unit 36 may be configured to render objects to be displayed into a frame buffer. Graphics unit 36 may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler/rotator circuitry, image compression/decompression circuitry, etc.

As mentioned above, the RT peripherals 22 may include the image processor 24 and the display pipes 26. The display pipes 26 may include circuitry to fetch one or more frames and to blend the frames to create a display image. The display pipes 26 may further include one or more video pipelines. The result of the display pipes 26 may be a stream of pixels to be displayed on the display screen. The pixel values may be transmitted to a display controller for display on the display screen. The image processor 26 may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16 and any cache memories implemented therein. The cache memories within processor 16 may also arbitrate the bridged memory operations with memory operations from the processors 16 to be transmitted on the CPU interface to the CPU port 44B. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
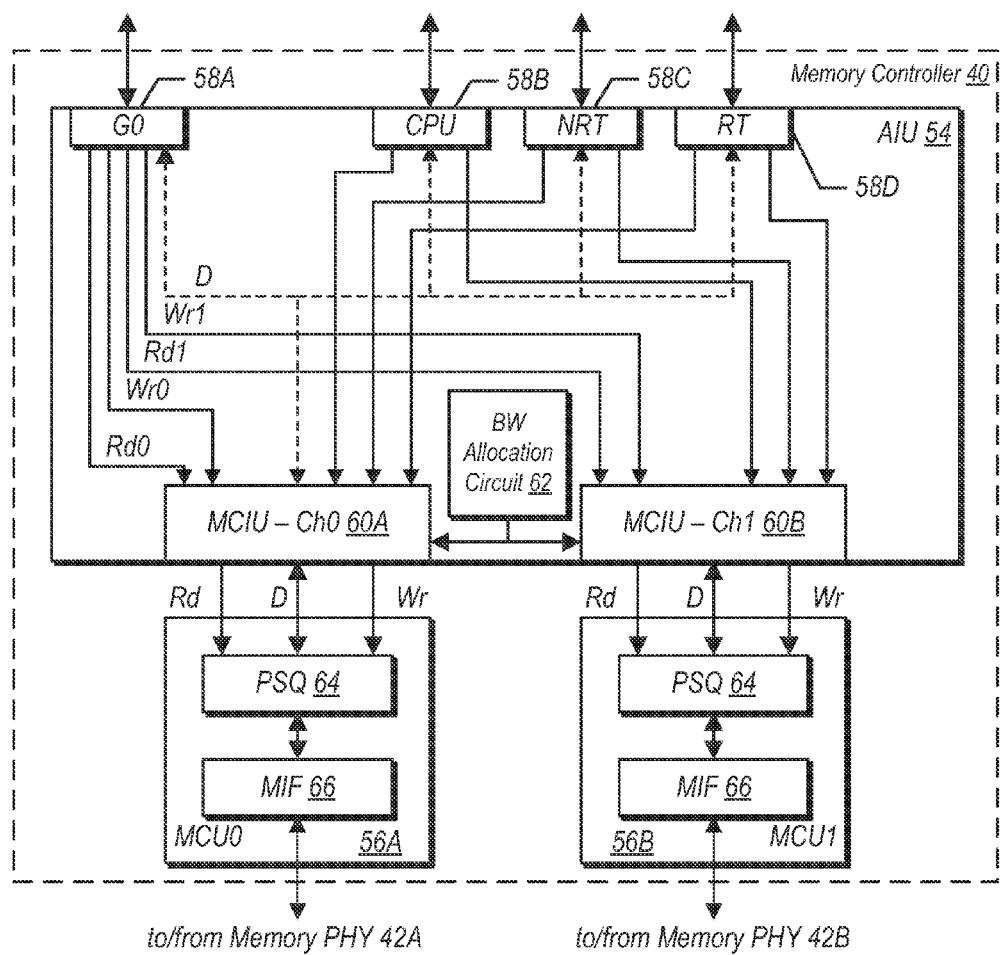
FIG. 2 a block diagram of one embodiment of the memory controller shown in FIG. 1.

Turning next to FIG. 2, a block diagram of one embodiment of the memory controller 40 is shown. In the embodiment of FIG. 2, the memory controller 40 includes an agent interface unit (AIU) 54 and one or more memory channel units 56A-56B. There may be one memory channel unit 56A-56B for each memory channel included in a given embodiment, and other embodiments may include one channel or more than two channels. As illustrated in FIG. 2, the AIU 54 may include multiple port interface units 58A-58D. More particularly, there may be a port interface unit 58A-58D for each port 44A-44D of the memory controller 40. The AIU 54 may further include memory channel interface units (MCIUs) 60A-60B (one for each memory channel unit 56A-56B). The AIU 54 may further include a bandwidth allocation circuit 62, which may determine memory access priority when multiple memory requests are pending. Additional details of bandwidth allocation circuit 62 will be discussed below in reference to FIG. 3.

Port interface units 58A-58D may be coupled to receive memory operations and to receive/transmit data and responses on the corresponding port, and may also be coupled to the MCIUs 60A-60B. The MCIUs 60A-60B may further be coupled to the bandwidth sharing registers 62 and to the corresponding MCU 56A-56B. As illustrated in FIG. 2, the MCUs 56A-56B may each include a presorting queue (PSQ) 64 and a memory interface circuit (MIF) 66. The PSQs 64 are coupled to the corresponding MCIUs 60A-60B and to the MIF 66 in the same MCU 56A-56B. The MIF 66 in each MCU 56A-56B is coupled to the corresponding memory PHY 42A-42B.

The AIU 54 may be configured to receive memory operations on the ports 44A-44D and to switch the memory operations to the channels addressed by those memory operations, using information received from bandwidth allocation circuit 62 in determining which memory operations to transmit to one of the MCUs 56A-56B prior to other memory operations to the same MCU 56A-56B.

More particularly, each port interface unit 58A-58D may be configured to receive the memory operations from the corresponding port 44A-44D, and may be configured to determine the memory channel to which a given memory operation is directed. The port interface unit 58A-58D may transmit the memory operation to the corresponding MCIU 60A-60B, and may transmit reads separately from writes in the illustrated embodiment. Thus, for example, the port interface unit 58A may have a Rd0 connection and a Wr0 connection to the MCIU 60A for read operations and write operations, respectively. Similarly, the port interface unit 58A may have a Rd1 and a Wr1 connection to the MCIU 60B. The other port interface units 58B-58D may have similar connections to the MCIU 60A-60B. There may also be a data interface to transmit read data from the port interface units 58A-58B to the MCIUs 60A-60B, illustrated generally as the dotted "D" interface for the MCIU 60A in FIG. 2.

The MCIUs 60A-60B may be configured to queue the memory operations provided by the port interface units 58A-58D, and to arbitrate among the memory operations to select operations to transmit to the corresponding MCUs 56A-56B. The arbitration among operations targeted at a given memory channel may be independent of the arbitration among operations targeted at other memory channels.

The MCIUs 60A-60B may be coupled to the bandwidth allocation circuit 62, which may determine, based on relative priorities associated with memory requests and their corresponding agents, how memory bandwidth on a channel is to be allocated to memory operations in the given channel. More particularly, bandwidth allocation circuit 62 may perform comparisons of priority rankings associated with different agents that may assert requests, and may use the comparison results to determine which agent is to be granted access to one of memories 12A or 12B when two or more agents have concurrent outstanding requests. In cases where two agents have equal priorities that are higher than the other agents, or when more than two agents have pending requests, MCIU's 60A-60B may used additional arbitration algorithms to determine which agent to grant access. For example, in one embodiment, the MCIUs 60A-60B may use a deficit-weighted round-robin algorithm to select among the ports when two or more agents have pending requests and/or the same priority ranking. In one embodiment, the determination of priority rankings may be based on a credit system may be used to control the relative number of operations from each port that are selected. However, other systems may be used to determine priority rankings.

The MCUs 56A-56B are configured to schedule memory operations from their queues to be transmitted on the memory channel. The MCUs may be configured to queue reads and writes separately in the PSQs 64, and may be configured to arbitrate between reads and writes using a credit based system, for example. In the credit-based system, reads and writes are allocated a certain number of credits. The number of write credits and read credits need not be equal. Each scheduled memory operation may consume a credit. Once both the write credits and the read credits are reduced to zero or less and there is a pending transaction to be scheduled, both credits may be increased by the corresponding allocated number of credits. Other embodiments may use other mechanisms to select between reads and writes. In one embodiment, the credit system may be part of the arbitration mechanism between reads and writes (along with measurements of the fullness of the write queue). That is, as the write queue becomes more full, the priority of the writes in the arbitration mechanism may increase.

In an embodiment, the MCUs 56A-56B may schedule memory operations in bursts of operations (each operation in the burst consuming a credit). If the burst reduces the credit count to zero, the burst may be permitted to complete and may reduce the credit count to a negative number. When the credit counts are increased later, the negative credits may be accounted for, and thus the total number of credits after increase may be less than the allocated credit amount.

To create bursts of memory operations for scheduling, the MCUs 56A-56B may group memory operations into affinity groups. A memory operation may be said to exhibit affinity with another memory operation (or may be said to be affine to the other memory operation) if the operations may be performed efficiently on the memory interface when performed in close proximity in time. Efficiency may be measured in terms of increased bandwidth utilization. For example, SDRAM memories are characterized by a page that can be opened using an activate command (along with an address of the page). The size of the page may vary from embodiment to embodiment, and generally may refer to a number of contiguous bits that may be available for access once the activate command has been transmitted. Asynchronous DRAM memories may similarly have a page that may be opened by asserting a row address strobe control signal and by providing the row address. Two or more memory operations that access data in the same page may be affine, because only one activate/RAS may be needed on the interface for the memory operations. SDRAM memories also have independent banks and ranks A bank may be a collection of memory cells within an SDRAM chip that may have an open row (within which page hits may be detected). A rank may be selected via a chip select from the memory controller, and may include one or more SDRAM chips. Memory operations to different ranks or banks may also be affine operations, because they do not conflict and thus do not require the page to be closed and a new page to be opened. Memory operations may be viewed as affine operations only if they transfer data in the same direction (i.e. read operations may only be affine to other read operations, and similarly write operations may only be affine other write operations). Memory operations to the same page (or to an open page) may be referred to as page hits, and memory operations to different banks/ranks may be referred to as bank hits and rank hits, respectively.

The MCUs 56A-56B may also be configured to schedule commands on the memory interface to the memories 12A-12B (through the memory PHYs 42A-42B) to perform the scheduled memory operations. More particularly, in an embodiment, the MCUs 56A-56B may be configured to presynthesize the commands for each memory operation and to enqueue the commands. The MCUs 56A-56B may be configured schedule the commands to provide efficient use of the memory bandwidth. The MIFs 66 in each MCU 56A-56B may implement the presynthesis of commands and the scheduling of the commands, in an embodiment.

Figure 3:
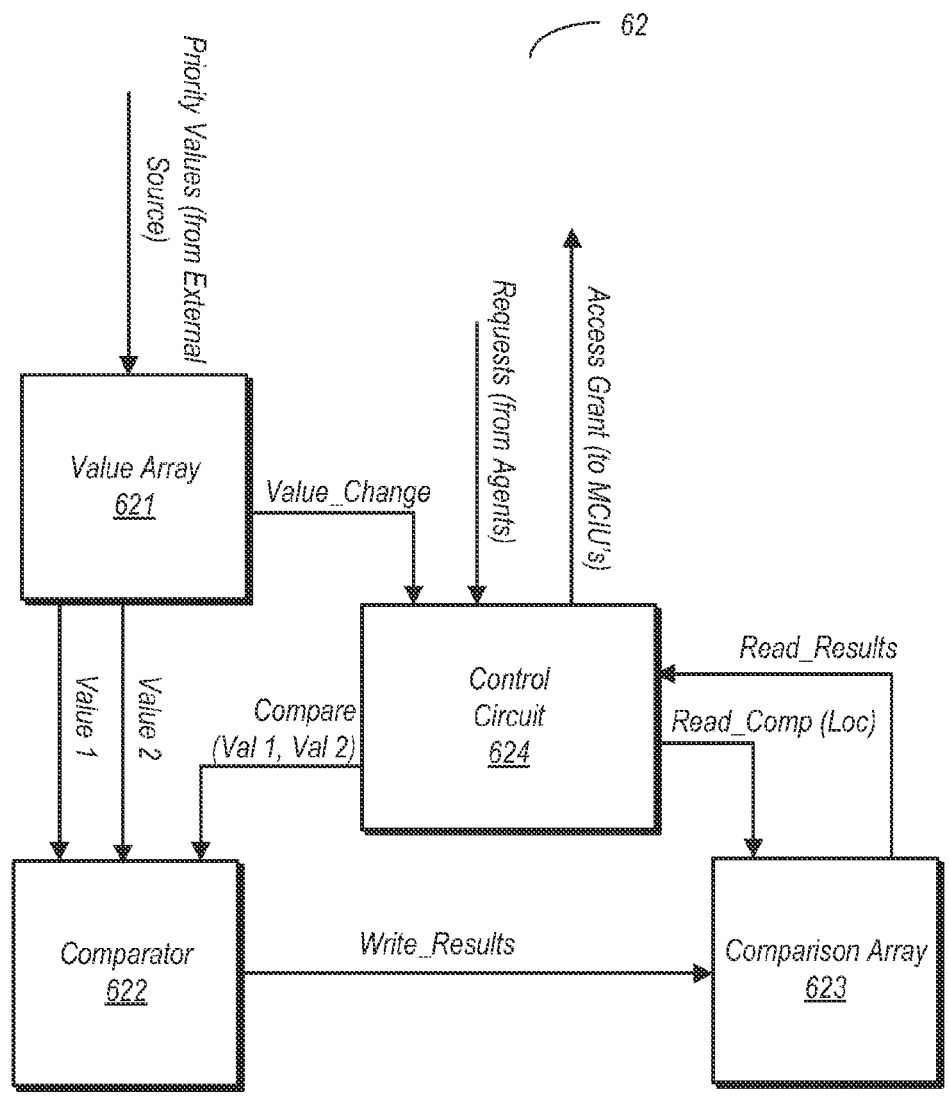
FIG. 3 is a block diagram of one embodiment of a bandwidth allocation circuit used in an embodiment of the memory controller shown in FIG. 2.

Turning now to FIG. 3, a block diagram of one embodiment of a bandwidth allocation unit is shown. In the embodiment shown, bandwidth allocation unit 62 includes a value array 621, a comparator 622, a comparison array 623, and a control circuit 624. Bandwidth allocation unit 62 may preemptively perform priority ranking comparisons for pairs of different agents that may request access to a shared resource. The results of the comparisons may be stored in comparison array 623 for subsequent access when multiple agents have concurrent requests pending for access to the shared resource. Thus, the comparisons may be speculatively performed with their results stored before they are needed. This may remove the comparison operation from a critical timing path, and may thus enable a faster priority determination.

In one embodiment of AIU 54 of IC 10 discussed above, bandwidth allocation unit 62 may be implemented to determine priorities for memory access requests (i.e. memories 12A and 12B are shared resources in this particular example). Bandwidth allocation unit 62 may be coupled to receive, from an external source, priority rankings for the various agents (e.g., graphics unit 36, CPU 14, etc.). In some embodiments, these priority rankings may be dynamic and may thus be updated from time to time (although embodiments in which the priority rankings are static are possible and contemplated). The priority rankings may be based on one or more factors such as traffic type (e.g., real time vs. non-real time), recently granted requests, latency requirements, age of any pending requests by the agent, type or request (e.g., read or write) and so on. Based on the received priority rankings, bandwidth allocation unit 62 may perform preemptive comparisons and store the results thereof in a comparison array for later use. For example, if both graphics unit 36 and CPU 14 have pending memory read requests, a corresponding value from comparison array 623 may be accessed to determine which (if either) of these two agents currently has a higher priority ranking. If the priority rankings are equal, additional arbitration (e.g., round robin) may be performed to determine which agent is granted access.

In the embodiment shown, the priority rankings may be received and stored into value array 621. In one embodiment, value array 621 may include a corresponding storage location for each agent that may access the shared resource. In addition, priority values may be updated from time to time during operation of the system in which bandwidth allocation unit 62 is implemented. When a value is updated, value array 621 may provide an indication (Value_Change) to control circuit 624.

Comparator 622 in the embodiment shown is configured to perform comparisons between each possible pair of priority values stored in value array 621. For example, if value array 621 is storing priority rankings labeled A, B, C, and D, comparisons may be performed for the following pairs: A and B, A and C, A and D, B and C, B and D, C and D. The priority values may be conveyed from value array 621 to comparator 622 via the signal paths labeled Value 1 and Value 2. Results of each comparison may be written into and stored in comparison array 623 via the signal path labeled Write Results. In the event that one of the values is updated, each relevant pair may be compared re-compared. For example, if priority ranking B is updated, comparisons between A and B, B and C, and B and D are performed again and comparison array 623 is updated accordingly. The other comparison values (e.g., A and C) may be left unchanged in this particular example.

Control circuit 624 may coordinate the operations of the other components of bandwidth allocation unit 62. Furthermore, control circuit 624 in the embodiment shown is configured to determine which of the agents is to be granted access to one of memories 12A and 12B (or other shared resource in other embodiments) when two or more concurrent requests are competing for access. In the embodiment shown, control circuit 624 is configured to receive indications of requests for access to memories 12A and 12B that are asserted by each of the agents mentioned above. When priority is to be resolved for two agents having respectively pending requests, control circuit 624 may read corresponding locations of comparison array 623. The read indication may be sent to comparison array 623 via the signal path Read_Comp (Loc), wherein 'LOC' indicates the corresponding location storing the requested comparison results. The comparison result stored at the corresponding storage location may then be provided to control circuit 624 via the signal path labeled Read_Results. If priority is to be resolved for more than two pending requests, arbitration may be performed by control circuit 24. In either case, a read of the results for the comparison between two requesting agents (or arbitration among three or more requesting agents) is performed to determine which may have the highest priority. When the request (and corresponding agent) having the highest priority is resolved, control circuit 624 may provide a corresponding indication to grant the request to one of the MCIUs 60A or 60B. In some cases, if the highest priorities are equal, additional arbitration may be performed. For example, in one embodiment, if two concurrently pending and competing requests have the same priority, as indicated by the value read from comparison array 624, a round robin arbitration scheme may be implemented to determine which of the corresponding agents is to be granted access.

In the embodiment shown, control circuit 624 is configured to control the comparison process. More particularly, when the value array is initially populated, control circuit 624 may provide indications to comparator 622 of the values stored in value array 624 that are to be compared. The indication may be provided to comparator 622 via the signal path labeled Compare (Val 1, Val 2), wherein Val 1 and Val 2 indicate the locations in value array 621 storing the priority values that are to be compared. Furthermore, if a priority value stored in value array 621 is updated, control circuit 624 may receive an indication of which value has been updated via the signal path labeled Value_Change. Responsive to receiving the indication, control circuit 624 may cause comparator 622 to perform comparisons for each relevant pair of priority values, with corresponding comparison results updated in comparison array 623.

It is noted that the use of bandwidth allocation unit 62 has been discussed herein with reference to a specific implementation. However, the disclosure is not intended to be limiting in this manner. More particularly, embodiments of an apparatus configured to operate in accordance with bandwidth allocation unit 62 may be utilized in a wide variety of embodiments in which multiple agents may access a shared resource. For example, an embodiment of an apparatus configured similarly to bandwidth allocation unit 62 for controlling access to a shared bus is possible and contemplated. Furthermore, it is noted that while the bandwidth allocation unit 62 is implemented on a same IC die as the agents as discussed in reference to the embodiments above, the disclosure is not intended to be limiting in this manner. Accordingly, embodiments in which the agents are implemented externally to an IC die upon which bandwidth allocation unit 62 is implemented are also possible and contemplated.

Figures 4A, 4B:
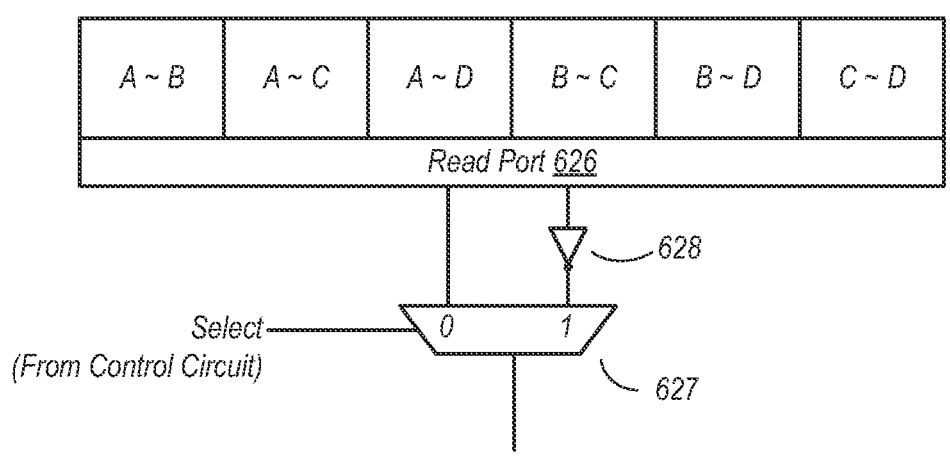
FIG. 4A is a drawing illustrating an embodiment of an array that may be used to store comparison results in the bandwidth allocation circuit of FIG. 3.
FIG. 4B is a drawing illustrating another embodiment of an array that may be used to store comparison results in the bandwidth allocation circuit of FIG. 3.

FIG. 4A is a drawing illustrating an embodiment of an array that may be used to store comparison results in the bandwidth allocation circuit of FIG. 3. In the embodiment shown, comparison array 623 includes locations for storing comparison results for comparisons between each possible pair of four different agents, A, B, C, and D. In the nomenclature used in the illustrated example, A~B indicates the result of A compared to B (i.e., the priority of A relative to B) while B~A indicates the result of B~A, and is the inverse of A~B.

Each comparison value stored in comparison array may be a single bit value in some embodiments, or a multiple bit value in other embodiments. In some embodiments in which the comparison values are single bit values, a logic 1 may indicate a higher priority (e.g., if A~B is a logic 1, then A has a higher priority than B). A logic 0 may indicate a lower or equal priority (e.g., if A~B is a logic 0, the priority of A is less than or equal to that of B. In one embodiment in which multiple bit values are used, a value of 11 may be used to indicate a higher priority, a 10 may be used to indicate an equal priority, and a value of 01 may be used to indicate a lower priority. In general, the comparison values may be stored in any suitable format, and thus the examples here are not intended to be limiting.

In the embodiment of FIG. 4A, the values along the diagonal axis are listed as 'X', indicating a "don't care" value, since the priority of an agent is always equal to itself (e.g., the priority of A is always equal to the priority of A). The values on one side of the diagonal are inverses of corresponding values on the other side of the diagonal. For example, the value of A~B is the inverse of B~A. Using this property, the comparison array 623 may be compressed, as shown in FIG. 4B. In FIG. 4B, only the entries from the portion of the array that is above and to the right of the diagonal in FIG. 4A are used. These entries are A~B, A~C, A~D, B~C, B~D, and C~D. In the example of comparison array 623 of FIG. 4B, an inverting circuit 628 and a multiplexer 627 are coupled to an output of the read port 626 (it is noted that the example of FIG. 4A also includes a read port, which is not shown for the sake of illustration). A comparison value accessed from comparison array 623 in FIG. 4B may be either the true result, or its complement, based on a selection signal provided by control circuit 624. For example, if the comparison result A~B is the desired output, then the selection signal may be set to select input 0 in the example shown. If the desired output is B~A, then A~B may be selected from the array and inverted by inverting circuit 628, with control circuit 624 selecting the 1 output. Utilizing a compressed comparison array 623 as shown in FIG. 4B may save circuit area, as the storage locations on one side of the diagonal as well as the diagonal itself is not required to obtain the same number of results. In this particular example, the 16 storage locations of FIG. 4A may be reduced to 6 storage locations in the array of FIG. 4B, while still enabling the same results to be obtained. Furthermore, the number of comparisons may be reduced, since the complement of any one comparison may be obtained by inverting.

It is noted that the use of entries on only one side of the diagonal is not limited to the example shown in FIGS. 4A and 4B, but may be applied more generally for any number of agents.

Figure 5:
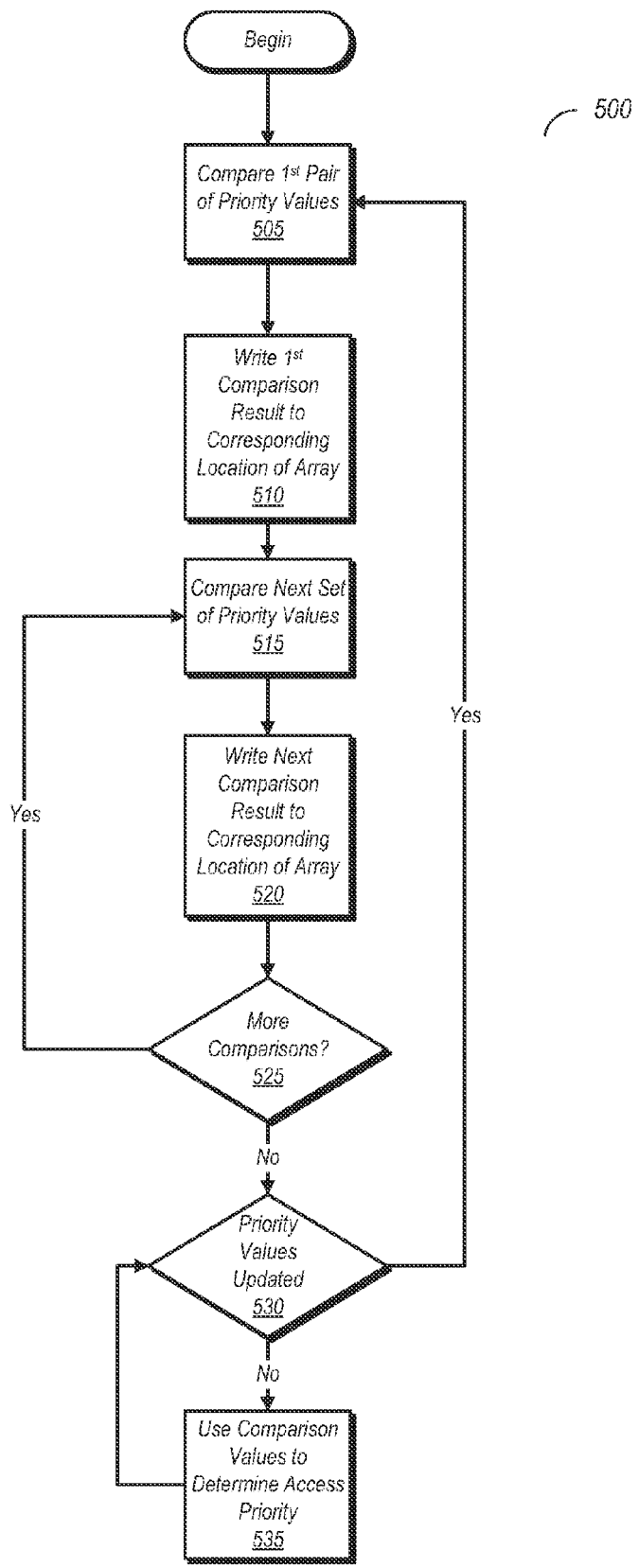
FIG. 5 is a flow diagram illustrating one embodiment of a method for populating storage locations of a comparison array.

FIG. 5 is a flow diagram illustrating one embodiment of a method for populating storage locations of a comparison array. In the embodiment shown, method 500 may be utilized with various embodiments of the hardware discussed above. Additionally, it is possible and contemplated that method 500 may also be used with hardware embodiments not explicitly discussed herein.

Method 500 begins with a comparison of a first pair of priority values (block 505). The priority values may be associated with a particular agent, a particular type of traffic, or a particular type of request for access to a shared resource. A result of the comparison of the first pair of priority values may be written to a corresponding location of a comparison array (block 510). Subsequently, a next pair of priority values may be compared (block 515). This result may also be written to a corresponding location of the comparison array (block 520). If more comparisons are to be performed (block 525, yes), then method 500 returns to block 515, and may repeat the cycle until all locations of the comparison array have been populated with a comparison result.

If no additional comparisons are required (block 525, no), but one of the priority values subsequently changes (block 530, yes), method 500 returns to block 505. Comparisons may be performed for each combination of priority values that includes the one that has been updated. If no additional comparisons are required and all priority values are current (block 530, no), then the comparison values currently stored in the comparison array may be accessed and used to determine an access priority corresponding to a given agent/request (block 535).

Figure 6:
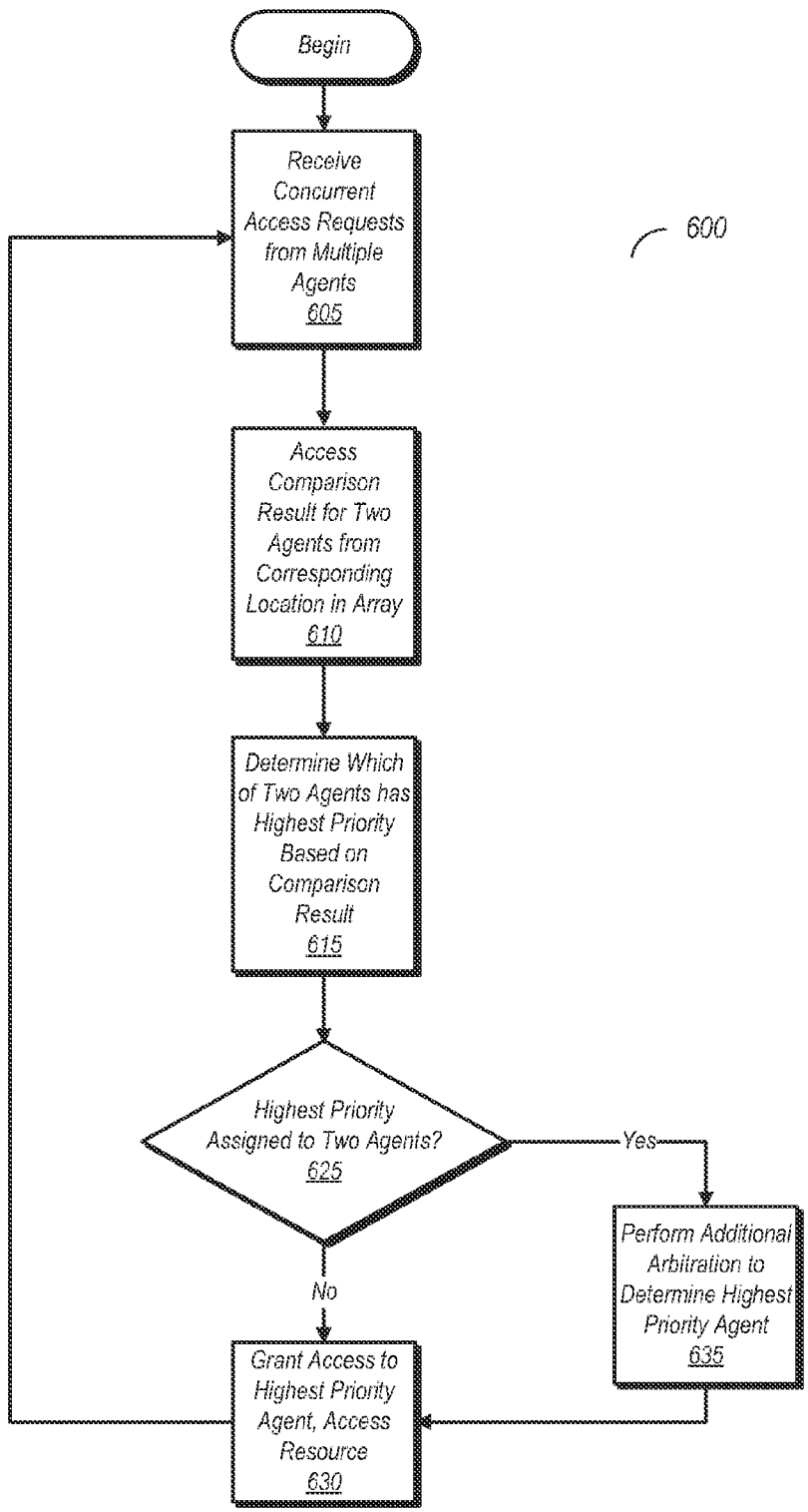
FIG. 6 is a flow diagram illustrating one embodiment of a method for using a comparison array for determining an access priority.

FIG. 6 is a flow diagram illustrating one embodiment of a method for using a comparison array for determining an access priority. Method 600 may be used with various embodiments of the hardware described above. It is further contemplated that method 600 may be used with hardware embodiments not explicitly described herein.

Method 600 in the embodiment shown begins with the receiving of concurrent requests for access to a shared resource by multiple agents (block 605). The number of concurrent requests may be two, and thus two agents may be requesting access to the shared resource. The concurrent requests may overlap in time such that they are effectively competing with one another for access to the shared resource, which may be a memory, a bus, or other type. Responsive to the requests, a comparison result may be read from a comparison array for two of the agents (block 610). The agent having the higher access priority may be determined based on the comparison result read from the comparison array (block 615). Method 600 in this embodiment does not deal with situation in which more than two concurrent requests are pending, wherein arbitration may be performed in lieu of serial reads of the comparison array until priority has been resolved for all agents.

The comparison results stored in the comparison array may be speculatively generated at a time prior to when the comparison actually occurs. Thus, instead of performing the comparison at the time of the multiple requests (which may require more logic levels and more time), the comparison result may be performed at a previous time and accessed from the comparison array when needed. Reading a comparison result from the comparison array may require fewer levels of logic and less time to complete than the actual performance of the comparison. Accordingly, faster operation may be obtained when the latency incurred from reading comparison results from the array is less than the latency incurred from performing the actual comparison.

If it is determined that two agents share the same priority value (block 625, yes), then additional arbitration may be performed to determine which agent has the highest access priority (block 635). Any suitable arbitration scheme may be used. If, on the other hand, the highest priority is not shared (block 625, no) and is instead assigned to a single agent, access may then be granted to the agent determined to have the highest access priority (block 630), and may thus access the shared resource. Similarly, the winner of the arbitration in block 635 may also be granted access as the highest priority agent, and may thus access the shared resource.

Figure 7:
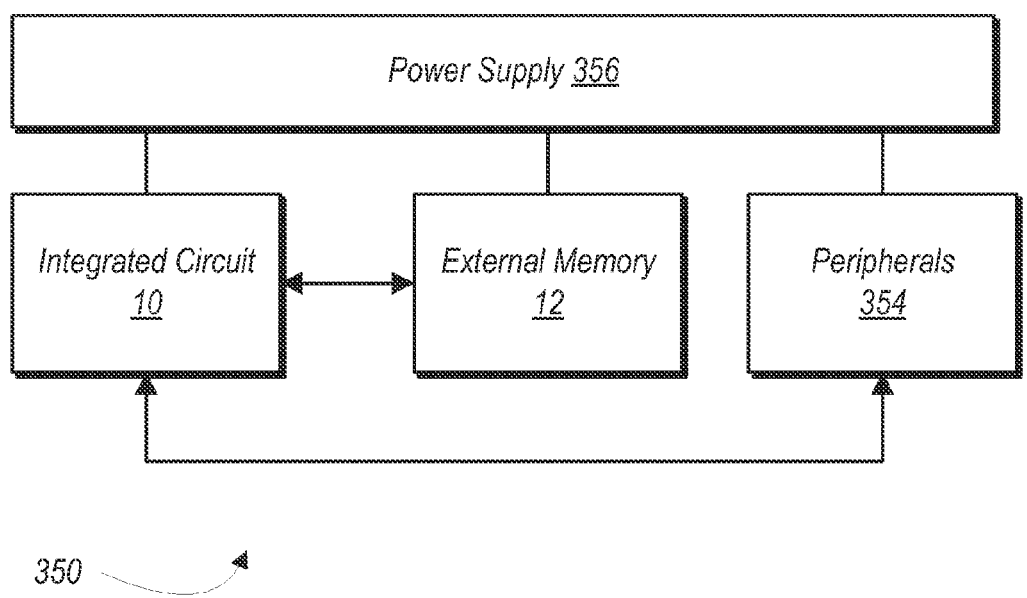
FIG. 7 is a block diagram of one embodiment of an exemplary system.

Turning next to FIG. 7, a block diagram of one embodiment of a system 350 is shown. In the illustrated embodiment, the system 350 includes at least one instance of the integrated circuit 10 coupled to external memory 12 (e.g. the memory 12A-12B in FIG. 1). The integrated circuit 10 is coupled to one or more peripherals 354 and the external memory 12. A power supply 356 is also provided which supplies the supply voltages to the integrated circuit 10 as well as one or more supply voltages to the memory 12 and/or the peripherals 354. In some embodiments, more than one instance of the integrated circuit 10 may be included (and more than one external memory 12 may be included as well).

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. An apparatus comprising:
a comparison array having a plurality of storage locations each storing a result of a preemptively performed comparison between a number associated with a one of a plurality of agents and a number associated with another one of the plurality of agents, wherein each comparison result indicates a relative priority between two different ones of the plurality of agents for access to a resource;
a value array coupled to a control circuit, wherein the value array is configured to store a number for each of the plurality of agents, wherein the number stored for each of the plurality of agents is indicative of a priority ranking for that one of the plurality of agents;
the control circuit configured to read a corresponding storage location from the comparison array responsive to a request for access to the resource by a first one of the plurality of agents and a concurrent request for access to the resource by a second one of the plurality of agents;
wherein the value array is configured to update a number corresponding to a given one of the plurality of agents responsive to a change of a priority ranking for the given one of the plurality of agents, and wherein the value array is coupled to provide an indication to the control circuit responsive to the change of the priority ranking for one of the plurality of agents, and wherein the control circuit is configured to cause an update in the comparison array of comparison results associated with the one of the plurality of agents preemptive to a request for access to the resource by the one of the plurality of agents.

2. The apparatus as recited in claim 1, wherein a corresponding comparison result stored in each of the plurality of storage locations indicates whether one of the plurality of agents has a priority that is greater than, lesser than, or equal to another one of the plurality of agents.

3. The apparatus as recited in claim 1, further comprising a comparator configured to:
receive a first number associated with one of the plurality of agents and a second number associated with another one of the plurality of agents;
compare the first number to the second number; and
write, to one of the plurality of storage locations, a result of comparing the first number to the second number.

4. The apparatus as recited in claim 3, wherein the control circuit is configured to cause the comparator to perform one or more comparison operations responsive to a change in value of a number associated with one of the plurality of agents.

5. The apparatus as recited in claim 1, wherein the resource is a system memory, and wherein the control circuit is configured to, responsive to reading the array, grant access to the resource to the one of the first and second agents having a higher priority as indicated by the comparison result stored in the corresponding one of the plurality of storage locations.

6. A method comprising:
storing, for each of a plurality of agents, a corresponding one of a plurality of values each indicating a priority assigned to its corresponding one of the plurality of agents, the plurality of values including first and second values, wherein the plurality of values are stored in a first array;
comparing the first value to the second value, wherein each of the first and second values are associated with first and second ones of a plurality of agents, respectively;
writing a result of said comparing to a first storage location of a second array having a plurality of storage locations including the first storage location, each of the plurality of storage locations storing an indication of a relative priority between two different ones of the plurality of agents for access to a resource, wherein said writing is performed preemptive to requests for access to a shared resource by the agents corresponding to the first and second values; and reading the first storage location responsive to concurrent requests by the first and second agents for access to the resource to determine which of the first and second agents has a higher access priority.

7. The method as recited in claim 6, further comprising granting access to the one of the first and second agents determined to have the highest access priority during said reading.

8. The method as recited in claim 7, wherein granting access to the one of the first and second agents comprises one of the following:
reading from a system memory;
writing to a system memory.

9. The method as recited in claim 6 further comprising:
repeating said comparing the first value to the second value responsive to a change in one of the first and second values;
writing a result of said comparing to a storage location in the second array.

10. The method as recited in claim 6, further comprising:
performing one or more additional comparisons responsive to a change in a value associated with one of the plurality of agents; and
writing results of each of the additional comparisons to corresponding storage locations in the second array.

11. A system comprising:
a first plurality of storage locations storing priority values for each of a plurality of functional units;
a comparator configured to perform comparisons of priority values stored in the first plurality of storage locations;
a second plurality of storage locations configured to store results of the comparisons, wherein the comparator is configured to cause an update to selected ones of the second plurality of storage locations responsive to a change in a priority value of a particular one of the plurality of functional units, wherein the update is performed preemptive to a request by the particular one of the plurality of functional units; and
a control circuit configured to access a corresponding comparison result stored in the second plurality of storage locations responsive to concurrent requests for access to a shared resource by first and second ones of the plurality of functional units, wherein the control circuit is configured to determine which of the first and second functional units has priority for access to the shared resource based on the accessed comparison result, and wherein the control circuit is configured to perform the update to the selected ones of the second plurality of storage locations responsive to receiving an indication of the change in priority value from the first plurality of storage locations.

12. The system as recited in claim 11, wherein the control circuit is configured to grant access to the shared resource to the one of the first and second functional units determined to have priority for access.

13. The system as recited in claim 11, wherein each of the second plurality of storage locations corresponds to a comparison result generated from a comparison of respected priority values of two different functional units.

14. The system as recited in claim 13, wherein each comparison result indicates that a selected one of the plurality of functional units has a priority that is greater than, lesser than, or equal to another one of the plurality of functional units.

15. A method comprising:
receiving a first request for access to a shared resource from a first functional unit;
concurrently receiving a second request for access to the shared resource from a second functional unit;
accessing a first comparison result from one of a first plurality of storage locations responsive to receiving the first request and concurrently receiving the second request, wherein the first comparison result indicates a result of comparing a first priority value associated with the first functional unit and a second priority value associated with a second functional unit, and wherein the first comparison result is generated preemptive to at least one of the first and second functional units requesting access to the shared resource;
determining, based on the first comparison result, which of the first and second functional units has priority for access to the shared resource;
storing a plurality of priority values in a second plurality of storage locations, wherein each of the plurality of priority values corresponds to one of a plurality of functional units, the plurality of functional units including the first and second functional units, wherein the plurality of priority values includes the first and second priority values; and
updating at least one comparison result stored in the first plurality of storage locations responsive to a change in at least one of the plurality of priority values stored in the second plurality of storage locations.

16. The method as recited in claim 15, further comprising:
providing the first priority value to a comparator, the first priority value corresponding to the first functional unit;
providing the second priority value to the comparator, the second priority value corresponding to the second functional unit;
comparing the first and second priority values; and
writing a result of said comparing the first and second priority values to the first plurality of storage locations.

17. The method as recited in claim 16, further comprising:
providing selected ones of the plurality of priority values to the comparator.

18. The method as recited in claim 17, further comprising:
comparing selected one of the plurality of priority values to other selected ones of the plurality of priority values to generate a plurality of comparison results including the first comparison result; and
writing the each of the first plurality of comparison results to corresponding ones of the first plurality of storage locations.

19. The method as recited in claim 15, further comprising:
granting access to the one of the first and second functional units determined to have a higher access priority by the comparison result; and
accessing the shared resource, wherein said accessing is performed by the one of the first and second functional units determined to have the higher access priority.

20. A system comprising:
a plurality of functional units;
a system memory, wherein each of the plurality of functional units is configured to access the system memory;
a first array having a first plurality of storage locations each configured to store a comparison result indicating an outcome of a comparison of a first number corresponding to first one of the plurality of functional units and a second number corresponding to a second one of the plurality of functional units, wherein comparison results corresponding to a given one of the plurality of functional units are stored preemptive to the given one of the plurality of functional units requesting access to the system memory;

a control circuit configured to access a comparison result from a corresponding one of the plurality of storage locations responsive to the first and second ones of the plurality of functional units concurrently asserting memory access requests, wherein the control circuit is configured to determine which of the first and second ones of the plurality of functional units has priority for access to the system memory based on the comparison result;

a second array, wherein the second array includes a second plurality of storage locations each configured to store one of a plurality of numbers associated with corresponding ones of the plurality of functional units, the plurality of numbers including the first and second numbers; and a comparison circuit coupled to the second array, wherein the comparison circuit is configured to perform comparisons of selected ones of the plurality of numbers and further configured to write results of the comparisons to corresponding storage locations of the first array;

wherein the control circuit is further configured to cause an update to at least one of the first plurality of storage locations responsive to receiving an indication of an update to the second plurality of storage locations.

21. The system as recited in claim 20, wherein the control circuit is configured to grant access to the system memory to the one of the first and second ones of the plurality of functional units determined to have the higher priority.

* * * * *